United States Patent
Saylor et al.

(10) Patent No.: US 9,037,577 B1
(45) Date of Patent: May 19, 2015

(54) FILTERING POSTS

(71) Applicant: MicroStrategy Incorporated, Vienna, VA (US)

(72) Inventors: Michael J. Saylor, Vienna, VA (US); Richard Gardner, Vienna, VA (US); Hector Vazquez, Ashburn, VA (US); Xiaodong Zhou, Vienna, VA (US)

(73) Assignee: MicroStrategy Incorporated, Vienna, VA (US)

( * ) Notice: Subject to any disclaimer, the term of this patent is extended or adjusted under 35 U.S.C. 154(b) by 94 days.

(21) Appl. No.: 13/723,427

(22) Filed: Dec. 21, 2012

Related U.S. Application Data

(60) Provisional application No. 61/661,493, filed on Jun. 19, 2012.

(51) Int. Cl.
*G06F 7/00* (2006.01)
*G06F 17/30* (2006.01)

(52) U.S. Cl.
CPC .................................. *G06F 17/30551* (2013.01)

(58) Field of Classification Search
None
See application file for complete search history.

(56) References Cited

U.S. PATENT DOCUMENTS

| | | | | |
|---|---|---|---|---|
| 8,527,496 | B2* | 9/2013 | Wable et al. | 707/711 |
| 8,595,225 | B1* | 11/2013 | Singhal et al. | 707/727 |
| 8,635,529 | B2 | 1/2014 | Shanmugarajah | |
| 8,726,142 | B2* | 5/2014 | Piantino et al. | 715/203 |
| 8,832,560 | B2* | 9/2014 | Yung et al. | 715/738 |
| 8,869,017 | B2* | 10/2014 | Piantino et al. | 715/203 |
| 2003/0171973 | A1 | 9/2003 | Wilce et al. | |
| 2007/0061759 | A1 | 3/2007 | Klein, Jr. | |
| 2007/0088678 | A1 | 4/2007 | Farago et al. | |
| 2008/0275877 | A1 | 11/2008 | Bates et al. | |
| 2011/0178995 | A1* | 7/2011 | Suchter et al. | 707/692 |
| 2011/0238608 | A1 | 9/2011 | Sathish | |
| 2011/0246457 | A1* | 10/2011 | Dong et al. | 707/725 |
| 2011/0246907 | A1* | 10/2011 | Wang et al. | 715/751 |
| 2011/0320423 | A1* | 12/2011 | Gemmell et al. | 707/706 |
| 2012/0179557 | A1* | 7/2012 | Gross | 705/14.73 |
| 2012/0185343 | A1 | 7/2012 | Jones et al. | |
| 2013/0036369 | A1 | 2/2013 | Mitchell et al. | |
| 2013/0067312 | A1 | 3/2013 | Rose | |

(Continued)

OTHER PUBLICATIONS

Meredith, Leslie, "Facebook's New 'Interests' Feature Helps Organize Your News Feed," TechNewsDaily, Mar. 12, 2012, 3 pages.

(Continued)

*Primary Examiner* — Robert Beausoliel, Jr.
*Assistant Examiner* — Michael Pham
(74) *Attorney, Agent, or Firm* — Fish & Richardson P.C.

(57) ABSTRACT

Methods, systems, and apparatus, including computer programs encoded on computer storage media, for filtering posts. One of the methods includes filtering a set of pages that are maintained in a social networking platform and in which a user has expressed interest based on one or more user-identified categories to identify a subset of the pages that are associated with the one or more identified categories. The method includes identifying posts in a data store associated with the pages in the subset. The method includes identifying a trending post from among the identified posts based on a measure of popularity of the identified posts. The method also includes sending data to a user device to cause the user device to display at least the trending post and some of the other identified posts with the posts ordered in the display with the trending post presented first and additional posts ordered chronologically.

16 Claims, 11 Drawing Sheets

(56) References Cited

U.S. PATENT DOCUMENTS

2013/0326406 A1 12/2013 Reiley et al.
2014/0278877 A1 9/2014 Yanacek et al.

OTHER PUBLICATIONS

U.S. Notice of Allowance for U.S. Appl. No. 13/723,545 dated Jan. 29, 2015, 12 pages.

* cited by examiner

FILTERING POSTS

CROSS-REFERENCE TO RELATED APPLICATION

Under 35 U.S.C. §119, this application claims the benefit of prior U.S. Provisional Application 61/661,493, filed on Jun. 19, 2012, which is incorporated in its entirety herein by reference.

BACKGROUND

Electronic communications platforms often allow users and other entities to share information with one another. The volume of information available to individual users within such electronic communications platforms may be relatively large. Consequently, an individual user of an electronic communications platform may not appreciate all of the information that is available to the user within the electronic communications platform. As a result, the user may miss, gloss over, or otherwise fail to appreciate information of some level of significance that is available to the user within the electronic communication platform.

SUMMARY

In general, one innovative aspect of the subject matter described in this specification can be embodied in methods that include the action of filtering a set of pages that are maintained in a social networking platform and in which a user has expressed interest based on one or more user-identified categories to identify a subset of the pages that are associated with the one or more identified categories. The methods also include the action of identifying posts in a data store associated with the pages in the subset. The methods also include the actions of identifying a trending post from among the identified posts based on a measure of popularity of the identified posts. The methods also include the actions of sending data to a user device to cause the user device to display at least the trending post and some of the other identified posts with the posts ordered in the display with the trending post presented first and additional posts ordered chronologically.

Other embodiments of this aspect include corresponding computer systems, apparatus, and computer programs recorded on one or more computer storage devices, each configured to perform the actions of the methods. A system of one or more computers can be configured to perform particular actions by virtue of having software, firmware, hardware, or a combination of them installed on the system that in operation causes or cause the system to perform the actions. One or more computer programs can be configured to perform particular actions by virtue of including instructions that, when executed by data processing apparatus, cause the apparatus to perform the actions.

The foregoing and other embodiments can each optionally include one or more of the following features, alone or in combination. The methods may include the actions of determining to extract, from the electronic social networking platform, new posts for a page in the subset of pages based on a time of filtering the set of pages and a time of previous extraction of posts from the page and storing the extracted new posts for the page in the data store. Determining to extract new posts for the page may include determining that a time lapse between the time of filtering to a time of a previous extraction of posts for the page is greater than a threshold. Identifying posts in the data store associated with the pages in the subset may include identifying posts in the data store associated with the pages in the subset before storing the extracted new posts in the data store. Identifying the trending post may include calculating a score for each of multiple posts among the identified posts based on a count of users who have expressed interest in the post, a count of comments the post has received, and an age of the post. Calculating the score may include calculating a sum of twice the count of comments the post has received and the count of users who have expressed interest in the post, and dividing that sum by the age of the post. The age of the post may be determined in hours. Filtering the set of pages to identify the subset of pages may include identifying at least one page in which the user has expressed interest but that the user had previously indicated to exclude and excluding the at least one page from the subset. The methods may include the action of identifying a time period. Identifying posts in the data store may include identifying posts that occurred within the time period. The methods may include the actions of receiving a request to display posts associated with a second category different from the one or more categories; filtering the set of pages to identify a second subset of the pages that are associated with the second category; identifying second posts in a data store associated with the pages in the second subset; identifying a second trending post from among the identified second posts based on a measure of popularity of the identified second posts; and sending second data to a user device to cause the user device to display at least the second trending post and some of the other identified second posts with the second posts ordered in the display with the second trending post presented first and additional second posts ordered chronologically. The data store may be a cached data store.

The details of one or more implementations of the subject matter described in this specification are set forth in the accompanying drawings and the description below. Other features and aspects of the subject matter will become apparent from the description, the drawings, and the claims.

DETAILED DESCRIPTION

Figure 1:
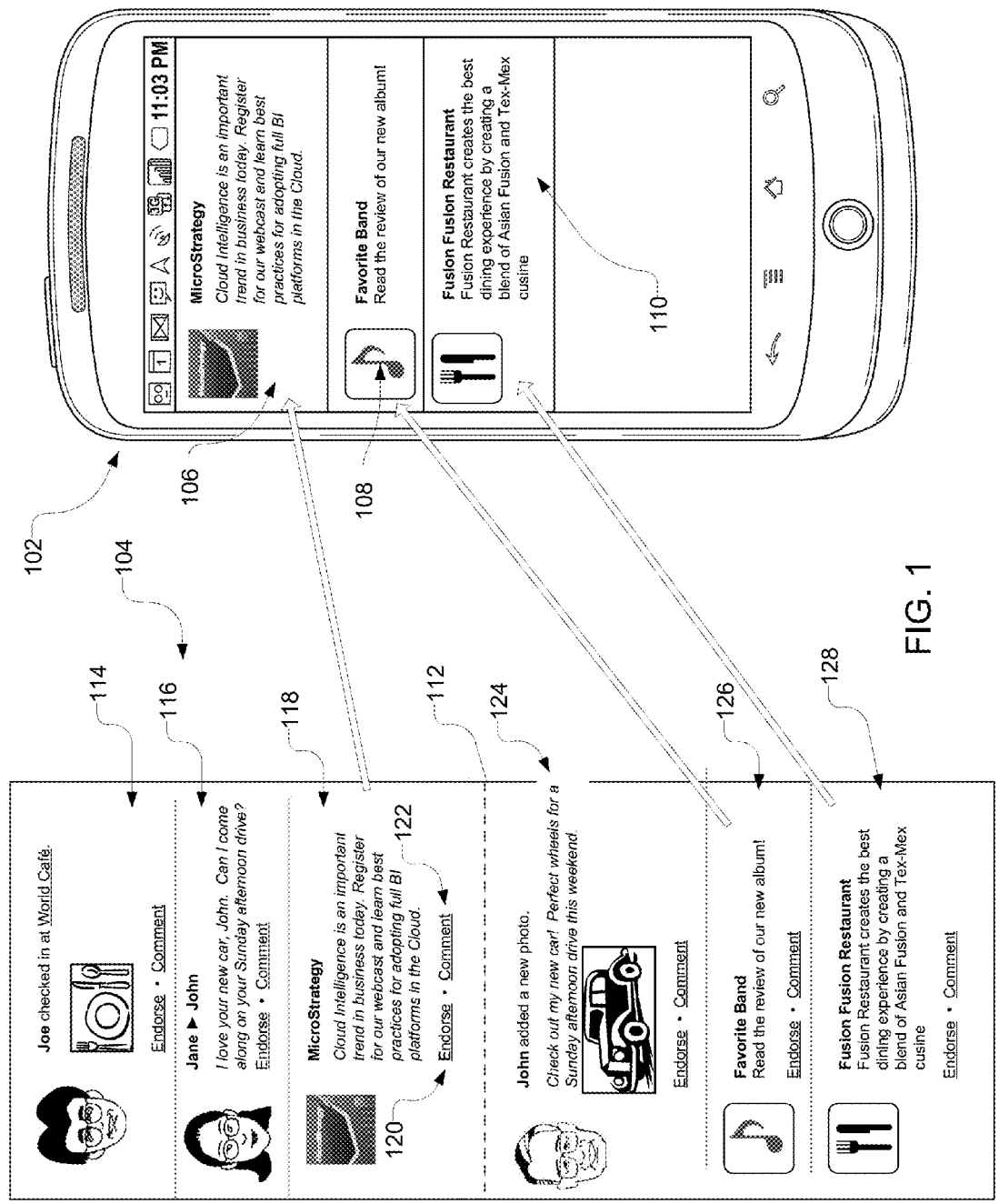
FIG. 1 illustrates filtering and displaying posts from an electronic social networking platform.

A social networking platform enables users to connect with other entities including other users and so-called "pages" (e.g., pages maintained within the social networking platform). Within the social networking platform, users may be represented as user objects that have certain defined properties, and pages may be represented as page objects that have certain defined properties that may be different than the defined properties for user objects.

While user objects generally represent the personas that individual users use to interact within the social networking platform, pages (and page objects) typically are different. Instead of representing the personas that individual users use to interact within the social networking platform, pages generally represent a cause or image that entities associated with the page objects are attempting to project to users of the social networking platform.

As such, page objects typically represent commercial (or at least non-personal) entities within the social networking platform. For example, pages may represent businesses, companies, organizations, institutions, places, brands, products, artists, bands, celebrities or other public figures, entertainment venues, media outlets, causes, communities, etc. Thus, while a page may represent an individual person like a celebrity or other public figure, the page does not typically represent the persona that that the celebrity or public figure uses to interact within the social networking platform. Rather, the page represents a cause or image that the celebrity or public figure is attempting to project to users of the social networking platform.

A user may form a connection to a page within the social networking platform by registering an endorsement of the page with the social networking platform. As such, the user may be able to form a connection with the page unilaterally (e.g., without requiring approval of the connection by the page (or an administrator associated with the page)). In contrast, the process of forming a connection between two users may involve bilateral participation from both users such that a connection is formed between two users after both users have consented to the connection.

Within the social networking platform, a user may receive updates from the entities with whom the user is connected, for example, in the form of posts and/or events, that may be displayed to the user in the form of a feed. Often a user's feed can become overwhelmed with updates, especially if the user is connected with a large number of other users and/or pages. As a consequence, items of interest to the user, such as posts from pages or events sponsored by pages, may be missed. This may have a negative impact on both the user and the pages. The user loses because the user misses out on posts and/or events that potentially may be of interest to the user. The pages lose because the user does not receive the posts or events that the pages are broadcasting. To help a user avoid missing posts from pages and/or events sponsored by pages, such posts and events may be extracted from the social networking platform, aggregated, filtered and presented to the user in a user-friendly interface.

There are many different examples of electronic social networking platforms. FACEBOOK, TWITTER, LINKEDIN, GOOGLE+, MYSPACE, and ORKUT are just a few examples. But, there are many others, and it is reasonable to expect many more to be launched in the future. The techniques described herein for handling data available from an electronic social networking platform are widely applicable and may be applied to data available from any relevant electronic social networking platform.

FIG. 1 illustrates filtering and displaying posts from an electronic social networking platform. The left hand side of FIG. 1 shows an exemplary post feed for a particular user identity of the electronic social networking platform which includes both posts from pages to which the particular user identity is connected (such as posts 118, 126, 128) and posts from individuals to which the user is connected (such as 114, 116, and 124). Due to the number of posts, the user's post feed may span multiple pages such that not all posts are visible on the user-interface at one time. As illustrated in FIG. 1, the portion of the feed above line 112 represents the portion of the post feed that is currently visible on the social networking page 104. The visible posts include the Joe post 114, the Jane post 116, and the MicroStrategy post 118. Older posts that are no longer visible on the social networking page 104 include the John post 124, the Favorite Band post 126, and the Fusion Fusion post 128. The user can view these posts by scrolling the screen to see additional, older posts.

The items presented in post feed on the social networking page 104 provide mechanisms that enable the particular user identity to react to the objects included within the items presented in the post feed. For example, each of the posts presented in post feed includes a selectable "Endorse" control, for example, the endorse control 120. Each of the posts also includes a selectable "Comment" control, for example the comment control 122.

The selectable "Endorse" control in a post enables the particular user identity to register an endorsement of the object(s) (e.g., content, message, and/or activity) included in the post. The electronic social networking platform records such endorsements and may present the number of endorsements registered in connection with the object(s) presented in a post in connection with the presentation of the item itself.

The selectable "Comment" control in a post enables the particular user identity to enter a responsive comment to the object(s) included in the post. The electronic social networking platform records such responsive comments and associates them with the object(s) included in the item so that the electronic social networking platform may present any such responsive comments in connection with the presentation of the post itself.

The right hand side of FIG. 1 shows an exemplary filtered user interface in which the user posts from the user's post feed are not included, leaving only the posts from the pages to which the user is connected within the electronic social networking platform (e.g., pages that the user has endorsed within the electronic social networking platform). Thus, the mobile device 102 displays selected posts, such as the MicroStrategy post 106, the Favorite Band Post 106, and the Fusion Fusion Restaurant post 110. The selected posts displayed in the filtered user interface include posts from pages associated with the user's feed in the social networking page 104. Thus, the filtered user interface displays a subset of the posts from the user's feed (shown on the left side in FIG. 1) generated by ignoring the posts from with other users of the social networking platform such that only the posts from pages the user has endorsed are displayed (e.g., only posts from commercial or non-personal entities are displayed). The selected posts may be associated with pages with which the user of the mobile device has a relationship on the electronic social networking platform (e.g., the pages that the user has endorsed). For example, the user has a relationship with the commercial entities MicroStrategy, Favorite Band, and Fusion Fusion Restaurant.

The mobile device enables the user to view posts from pages in an aggregated manner that may reduce the likelihood that the user will miss or overlook the posts from the pages. For example, the Favorite Band Post 126, and the Fusion Fusion Post 128 are not visible on the first page of the post feed (e.g., they are below line 112 which indicates the portion of the user's feed that is visible without scrolling) but are displayed as the Favorite Band post 108, and the Fusion Fusion Restaurant Post 110 on mobile device 102. Thus, aggregation of posts from pages may enable the user to view such posts without having to scroll through multiple screens of posts. Additionally or alternatively, aggregation of posts from pages may enable the user to view such posts in an environment that is free from the clutter of posts from various other users of the electronic social networking platform.

In some examples, a user may desire to further filter the aggregation of posts from pages. For example, if a user has endorsed a large number of pages even after removing the user-based posts, the user may still have a large number of posts that are associated with the pages the user has endorsed. Additionally or alternatively, the user may be interested in viewing posts by pages related to a specific category of interest to the user. A user can further organize the posts from the pages by creating and organizing the pages into categories such that the user can select to view posts associated with a particular category.

Figure 2:
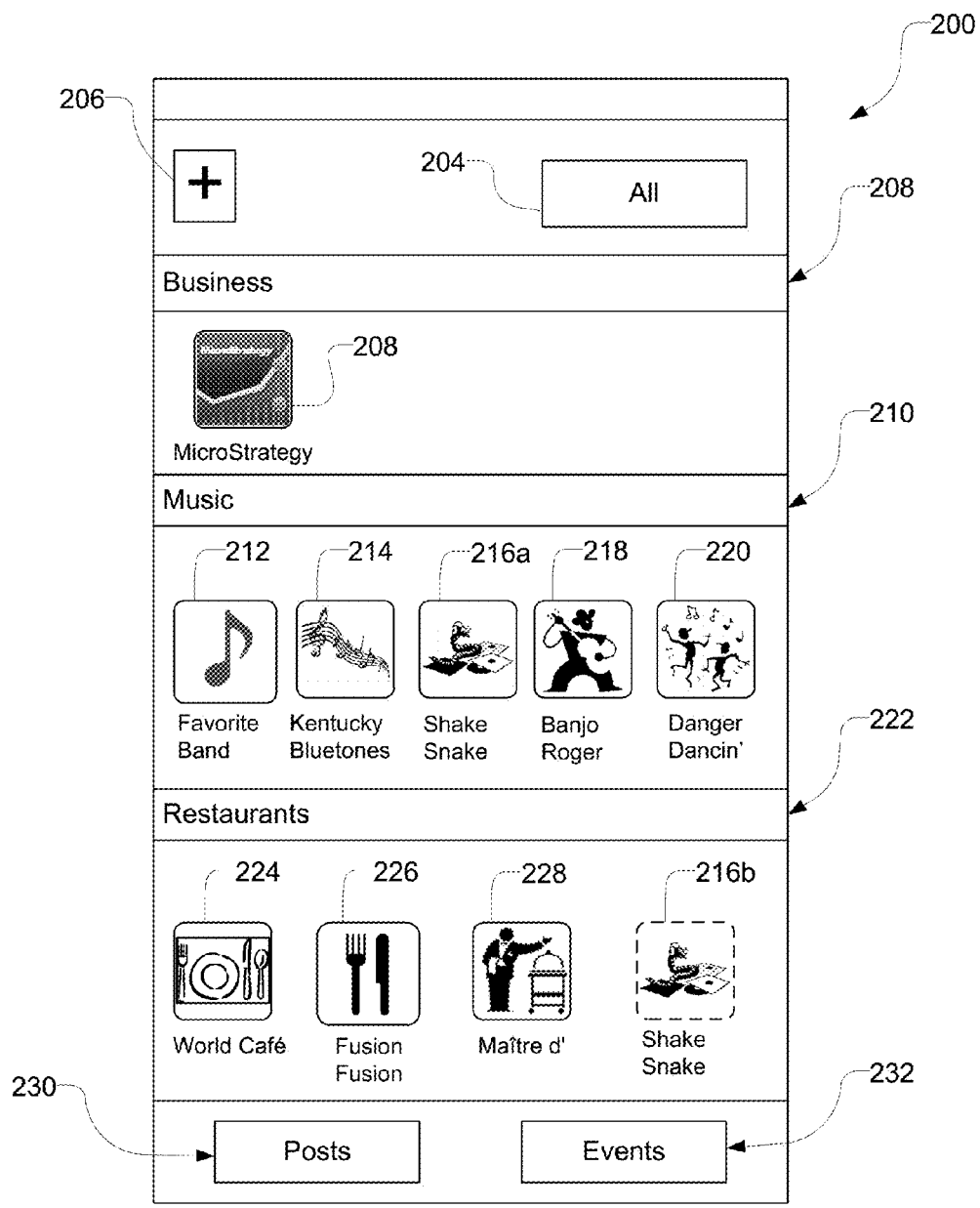
FIG. 2 illustrates a user interface.

FIG. 2 illustrates a user interface 200 for creating and organizing categories that the user can use to filter posts from pages and events sponsored by pages. These categories can be, for example, subject matter groupings. For example, a user may be associated with a number of political entities and a number of sports related entities. The user may desire to view only posts or events within one category at a particular time. The user interface 200 shows the pages with which the user has a relationship in the social networking platform organized into categories. For example, an icon representing the MicroStrategy page 208 is organized under the business category 208. Icons representing the Favorite Band page 212, the Kentucky Bluetones page 214, the Shake Snake page 216a, the Banjo Roger page 218, and the Danger Dancin' page 220 are organized under the music category 210. The icon representing the World Café page 224, the Fusion Fusion page 226, and the Random Gourmand page 228 are organized under the restaurant category 222.

Initial categories may be determined for each page based on information provided by the electronic social networking platform. For example, the electronic social networking platform may associate each page with a category. A mapping function may map categories provided by the electronic social networking platform to categories displayed on the user interface.

Additionally or alternatively, the user may create custom categories by selecting the add category button 206. Responsive to selection of the add category button 206, the user may be prompted to provide a name for the category to be added (not shown). Thereafter, the user may be enabled to add pages to the newly created category. In some implementations, the user can change a page from one category to another by selecting and dragging the icon from one category to another. For example, the Shake Snake page may be re-categorized from the Music category 210 to the Restaurants category 222 by dragging the Shake Snake icon from the position of the icon 216a to the position of the icon 216b. In other implementations, the user can change a page from one category to another by pressing and holding the icon until a contextual menu is displayed. The contextual menu may present the user with the options of moving the page to another category, or of hiding that page (e.g., as described below).

In some implementations, a user may instruct the system to hide a page within the application although the user remains connected to the page within the social networking platform. Hidden pages may be ignored by the system resulting in posts and events associated with hidden pages not being displayed to the user. For example, a user may hide a page by placing the page into a hidden page category.

The user may select to view posts and/or events from a single category of pages by selecting the category (for example, by clicking or tapping the category header). The user may select to view posts and/or events from a single page by selecting the icon representing the page. The user may select to view all posts and/or events from all categories of pages by selecting the ALL button 204.

At the bottom of the user interface 200 is a posts button 230 and an events button 232. Posts button 230 and events button 232 allow the user to request to view posts or events, respectively, from pages to which the user is connected within the social networking platform. For example, selection of the posts button 230 may result in the display of the user interface 300 discussed below with respect to FIGS. 3A-B. Similarly, selection of the events button 232 may result in the display of the user interface 400 discussed below with respect to FIGS. 4A-B.

Figure 3A:
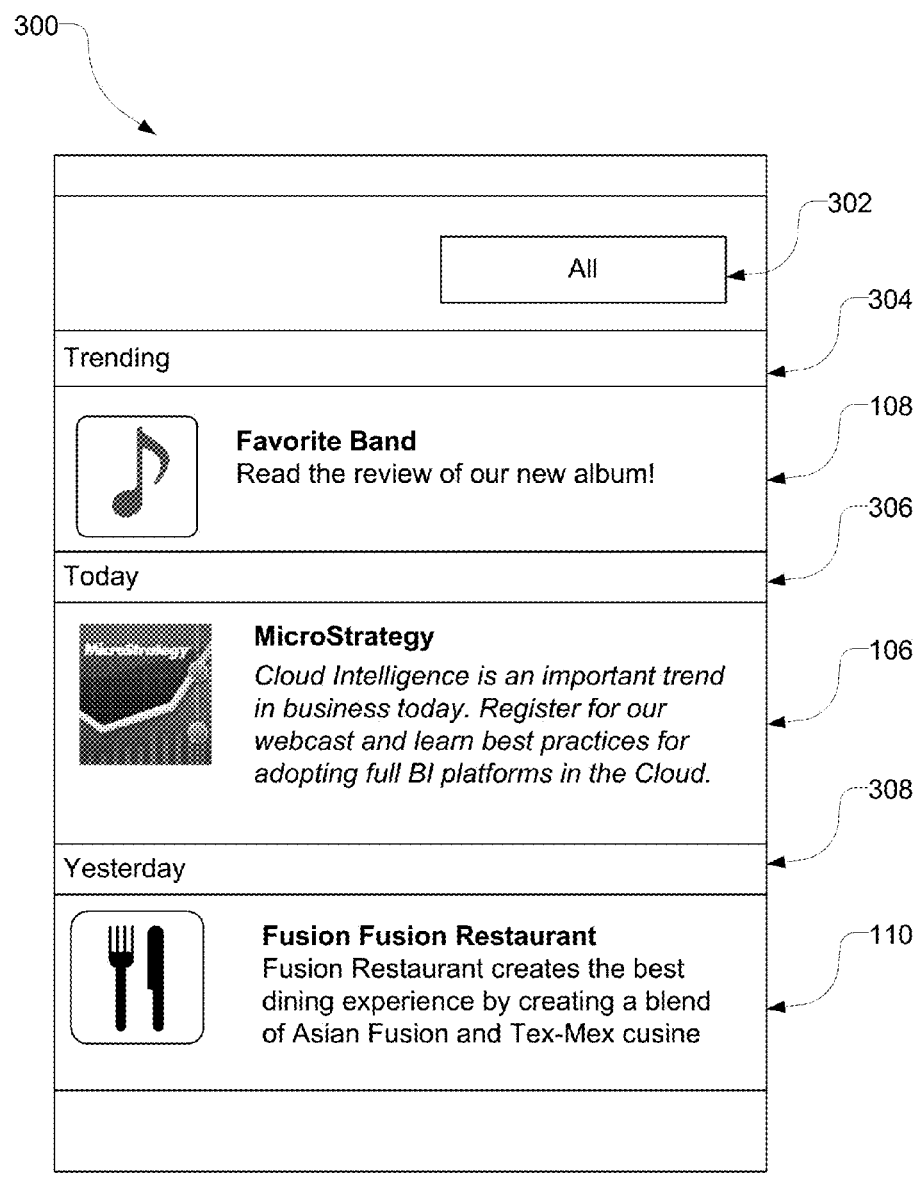
FIGS. 3A-B illustrate user interfaces for displaying posts on a user device.

FIG. 3A illustrates a user interface for displaying posts from pages to which the user is connected in an electronic social networking platform. The displayed posts are selected posts from the user's post feed and are sorted in a manner that may allow the user to quickly scan the posts and identify relevant posts. As described in more detail to follow, the posts are ordered with a trending post followed by the remaining posts in chronological order.

The user interface 300 is subdivided into sections. The user interface includes a trending section 304. The trending section 304 includes a single post, the favorite band post 108. In some implementations, the trending post section 304 includes multiple posts (e.g., between two and five posts). In some implementations, the number of posts in the trending post section 304 may be configured by the user device or by a computer system providing the posts. The post(s) in the trending section 304 is selected from among all the available posts based on a measure of the popularity of the post. To prevent an extremely popular post from dominating the trending section for a prolonged period of time, the measure of popularity may be based in part on the age of the post, so that older posts automatically have their score reduced. The age may be determined based on a timestamp associated with the time the post was created and the current time. In some implementations, the age of the post is determined in hours.

In some implementations, a post is no longer considered a potential trending post if it is greater than a threshold number of hours old (for example, 24 hours, 48 hours, 72 hours). Efficiency can be improved by not scoring posts which are older than the threshold number of hours.

In some implementations the measure of the popularity of the post can be determined based on the number of comments the post has received, the number of individuals who have expressed interest in the post, and/or the age of the post. For example, the measure of the popularity of the post may be determined according to the formula:

$$\text{popularity} = \frac{(2(\text{comments}) + \text{endorsements})}{\text{ceiling}[\text{age}]}$$

where popularity is the measure of popularity, comments is the number of comments the post has received, endorsements is the number of endorsements the post has received, age is the age of the post, in hours, and ceiling is mapping function that maps the real number associated with the age of the post to the largest following integer.

The remaining sections of the user interface 300 subdivide the posts according to time. For example, the today section 306 includes the posts from pages made during the most recent calendar day, such as the MicroStrategy post 106. The yesterday section 308 includes posts from pages made the previous calendar day, such as the Fusion Fusion post 110.

In some scenarios, there may be too many posts to display on the user's device at a single time. Under these circumstances, a user may be able to scroll the user interface to view additional posts.

The user interface 300 can display posts into sections using other criteria. For example, the user interface 300 can display a section for each category. For example, posts related to the restaurant category may be grouped together.

The user interface 300 includes a category selection button 302. As described in further detail above, the category selection button 302 allows a user to select categories pages from which posts are to be presented in the user interface 300. For example, selecting the category select button 302 may cause the display of the user interface 200 of FIG. 2. In this example, the category select button 302 displays "All" indicating that posts from all categories of pages are displayed.

The user interface 300 may be provided as part of an application executing on a user device. The user interface 300 may also be provided as a webpage delivered to a web browser executing on the user device. An example user device is an electronic device that is under control of a user and that is capable of requesting and receiving resources over the network. A user device may include one or more processing devices, and may be, or include, a mobile telephone (e.g., a smartphone), a laptop computer, a handheld computer, a tablet computer, a network appliance, a camera, an enhanced general packet radio service (EGPRS) mobile phone, a media player, a navigation device, an email device, a game console, an interactive or so-called "smart" television, or a combination of any two or more of these data processing devices or other data processing devices. In some implementations, the user device can be included as part of a motor vehicle (e.g., an automobile, an emergency vehicle (e.g., fire truck, ambulance), a bus).

Figure 3B:
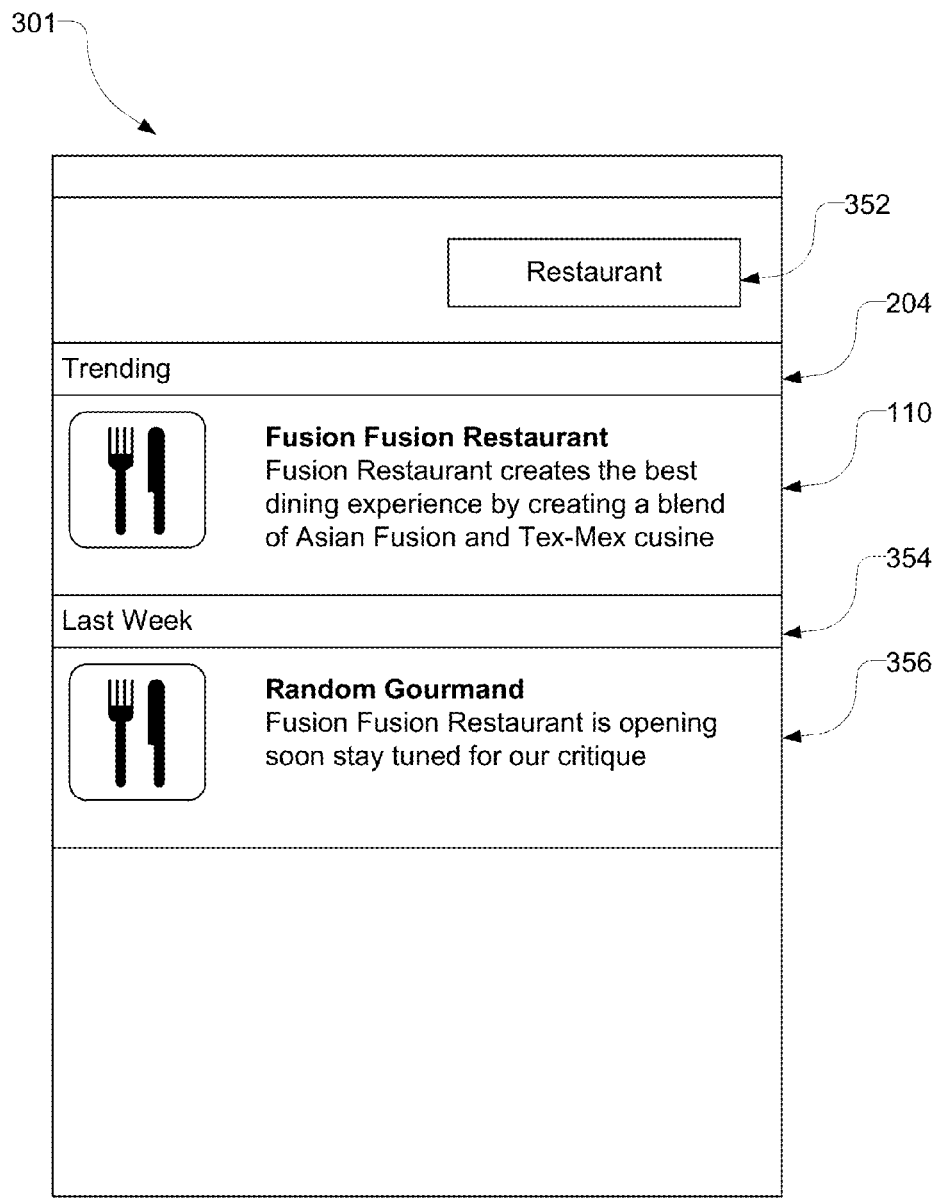

As noted above, a user can select to filter the posts displayed on the user interface according to posts from predefined categories of pages such as the categories shown in FIG. 2. FIG. 3B illustrates a user interface for displaying posts from a particular category of pages from a user's post feed maintained in an electronic social networking platform. In this example, the user has elected to filter the user interface 301 based on the category "Restaurants" 352. Similar to the organization of the user interface 300 shown in FIG. 3A, user interface 301 includes both a top trending post and additional posts sorted in chronological order. The top trending post for the category is displayed based on a measure of the popularity of the posts from pages included in the particular category. As a result, the top trending section 304 displays the Fusion Fusion post 110.

The user interface 301 is populated with posts from pages related to the restaurant category. Posts that may not be visible on the first page of the user interface may appear when filtered based on category. For example, the Random Gourmand post 356 visibly appears on the user interface 301 but not on the user interface 300 of FIG. 3A.

In addition to publishing posts, pages maintained within an electronic social networking may sponsor events. In general, events are descriptions of future occurrences related to the page. As such, each event may be associated with a time and place at which the event is scheduled to occur. For example, a page for a band may sponsor events that correspond to concerts on the band's touring schedule. A page for a store may sponsor events that correspond to sales and other promotional events at the store. Presenting the events together in a feed that is not cluttered by other content, such as, for example, user posts, may increase the likelihood that a user will not miss an event of interest to the user. The mobile device enables the user to view events from entities in an aggregated manner. In addition, the events may be displayed to the user based on a time for the event rather than the time at which the notification of the event was added to the user's feed. Presenting the events in such a chorological order can help to remind the user of events that may have been posted to a user's feed well in advance of the event.

Figure 4A:
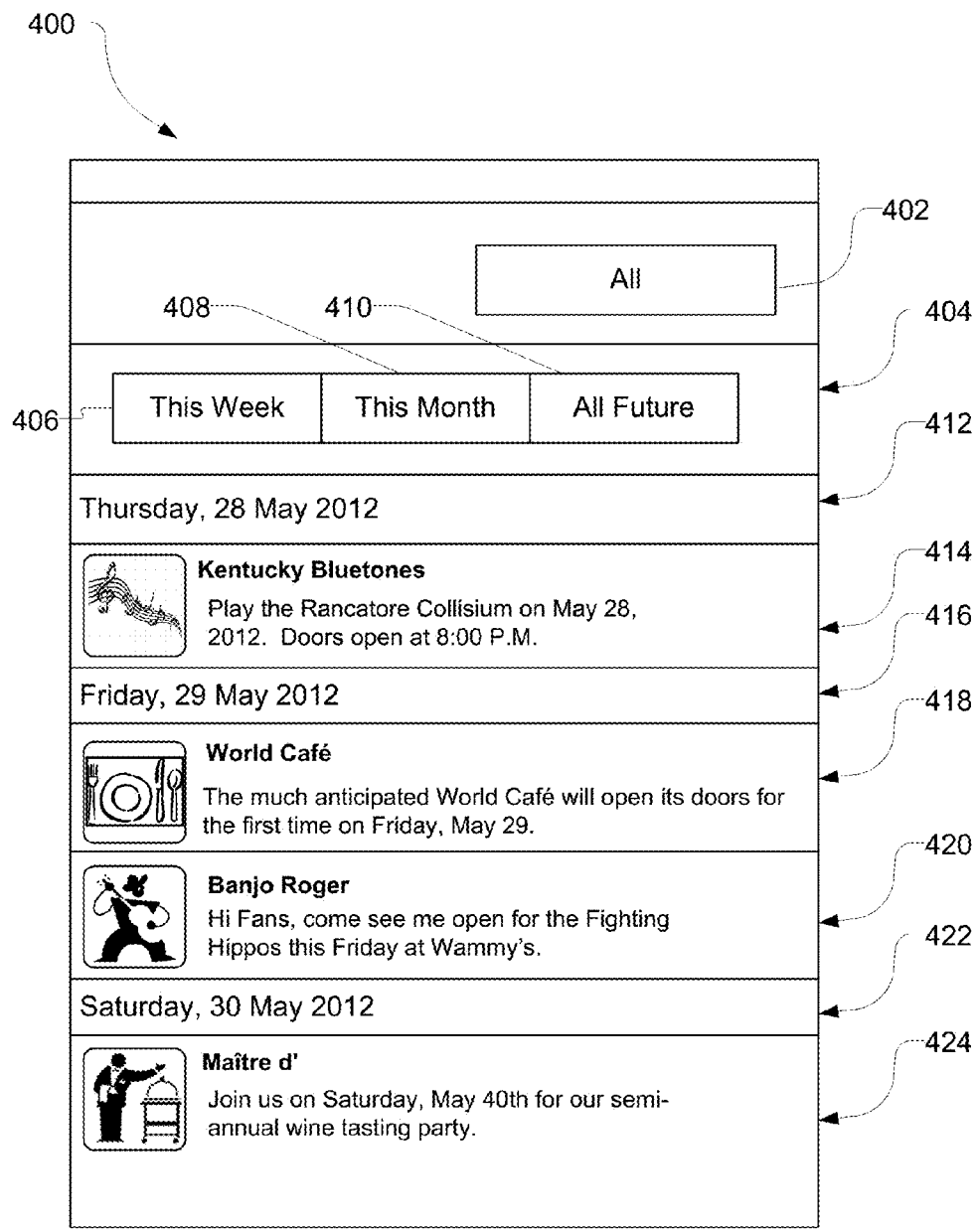
FIGS. 4A-B illustrate user interfaces for displaying events on a user device.

FIG. 4A illustrates a user interface 400 for displaying events from a user's feed maintained in a social networking platform. The user interface 400 displays events from pages that the user has endorsed. The user interface 400 includes a category selection button 402. The category selection button 402 allows the user to filter the events based on a particular page or category of pages. For example, selecting the category select button 302 may cause the display of the user interface 200 of FIG. 2. In this example, the category select button 402 displays "All" indicating that events from all categories are displayed.

The user interface includes a time filter selection region 404. The user may filter the events displayed on the user interface by selecting a time frame. In this example, the user may select events occurring this week, this month, or all future events by selecting the "this week" button 406, the "this month" button 408, and the "all future" button 410, respectively.

The events can be displayed according to the date upon which the event is to occur. For example, the Kentucky Bluetones event 414 is displayed in association with the Thursday, 28 May 2012 date 412. The World Cafe event 418 and the Banjo Roger event 420 are displayed in association with the Friday, 29 May 2012 date 416. The Random Gourmand event 424 is displayed in association with the Saturday, 30 May 2012 date 422.

In some scenarios, there may be too many events to display on the user's device at a single time. Under these circumstances, a user may be able to scroll the user interface to view additional events.

In some implementations, the events may be displayed using other filters. For example, the events may be displayed based on geographic regions such as city, metro area, state, etc. The events may also be displayed based on the proximity of the events to the user. For example, events may be displayed that are occurring within 10 miles of the user device, 20 miles of the user device, etc. The location of the events can be determined based on location information (e.g., street address, latitude/longitude coordinates, and/or Global Positioning System (GPS) coordinates) provided for the event by the electronic social networking platform. The location of the events can also be determined by searching for the event, the venue of the event, or the business associated with the page on a conventional web search engine and determining a location for the event based on address information provided in the search results.

Figure 4B:
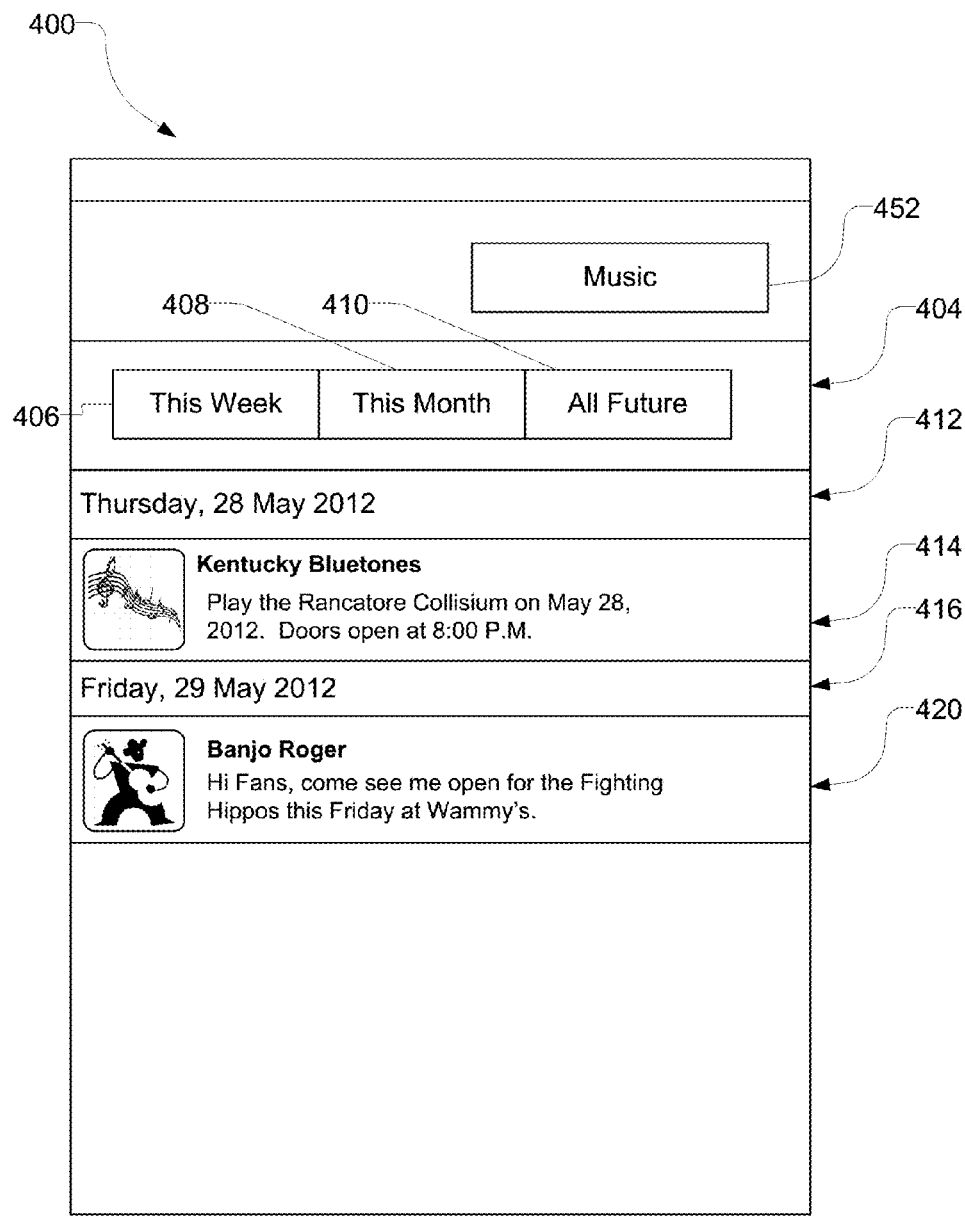

FIG. 4B illustrates a user interface for displaying events sponsored by pages within a particular category from a user's event feed maintained in an electronic social networking platform. In this example, the user has elected to filter the user interface 400 based on the category "Music" 452. As a result, the Kentucky Bluetones event 414 is displayed in association with the Thursday, 28 May 2012 date 412 and the Banjo Roger event 420 are displayed in association with the Friday, 29 May 2012 date 416. The events associated with pages of different categories are not displayed.

While the examples shown in FIGS. 3A-B and 4A-B provide separate feeds for posts and events related to pages endorsed by the user, a single feed could include both posts and events related to the pages.

Figure 5:
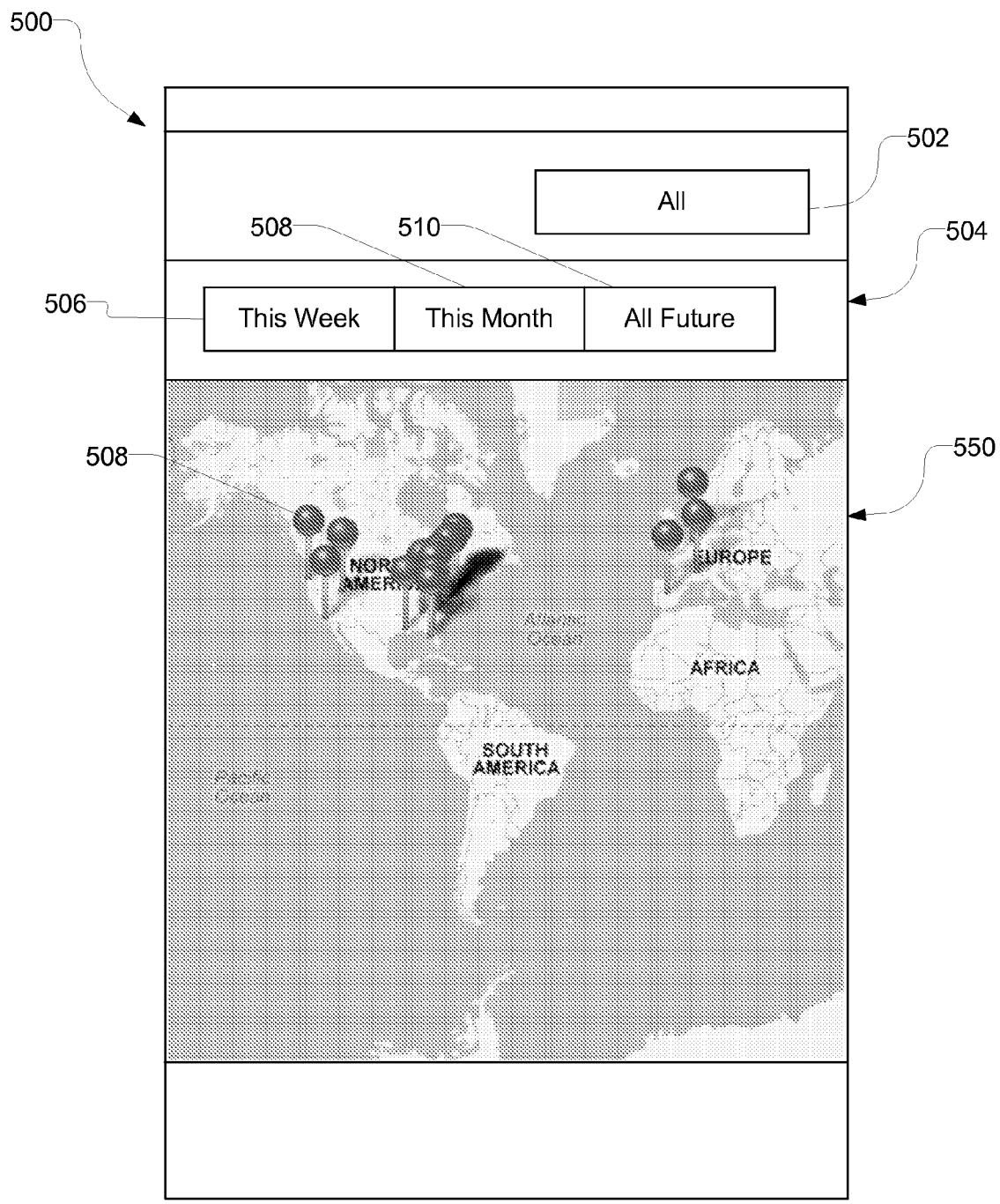
FIG. 5 illustrates a user interface for displaying events on a user device.

A map button (not shown) allows the user to request to view the events presented in user interface 400 in a map view. FIG. 5 illustrates another user interface for displaying events (e.g., the events from the user interface 400 of FIG. 4A) on a user device. The events can be displayed by location on a map 550. Pins (e.g., the pin 508) mark the locations of the events on the map 550. Displaying events in a location-based view can provide the advantage of allowing a user to easily identify events occurring in the user's vicinity at any given time.

The user interface 500 displays events from pages that the user has endorsed. Similar to the user interfaces described above, the user interface 500 includes a category selection button 502. The category selection button 502 allows the user to filter the events based on a particular page or category of pages.

The user interface includes a time filter selection region 504. The user may filter the events displayed on the user interface by selecting a time frame. In this example, the user may select events occurring this week, this month, or all future events by selecting the "this week" button 506, the "this month" button 508, and the "all future" button 510 respectively.

A posts button (not shown) allows the user to request to view posts from pages to which the user is connected within the social networking platform. For example, selection of the post button may result in the display of the user interface 300, discussed above with respect to FIG. 3A. A calendar button (not shown) allows the user to request to view the events in a calendar view. For example, selection of the calendar button may result in the display of the user interface 400 discussed above with respect to FIG. 4A.

Figure 6:
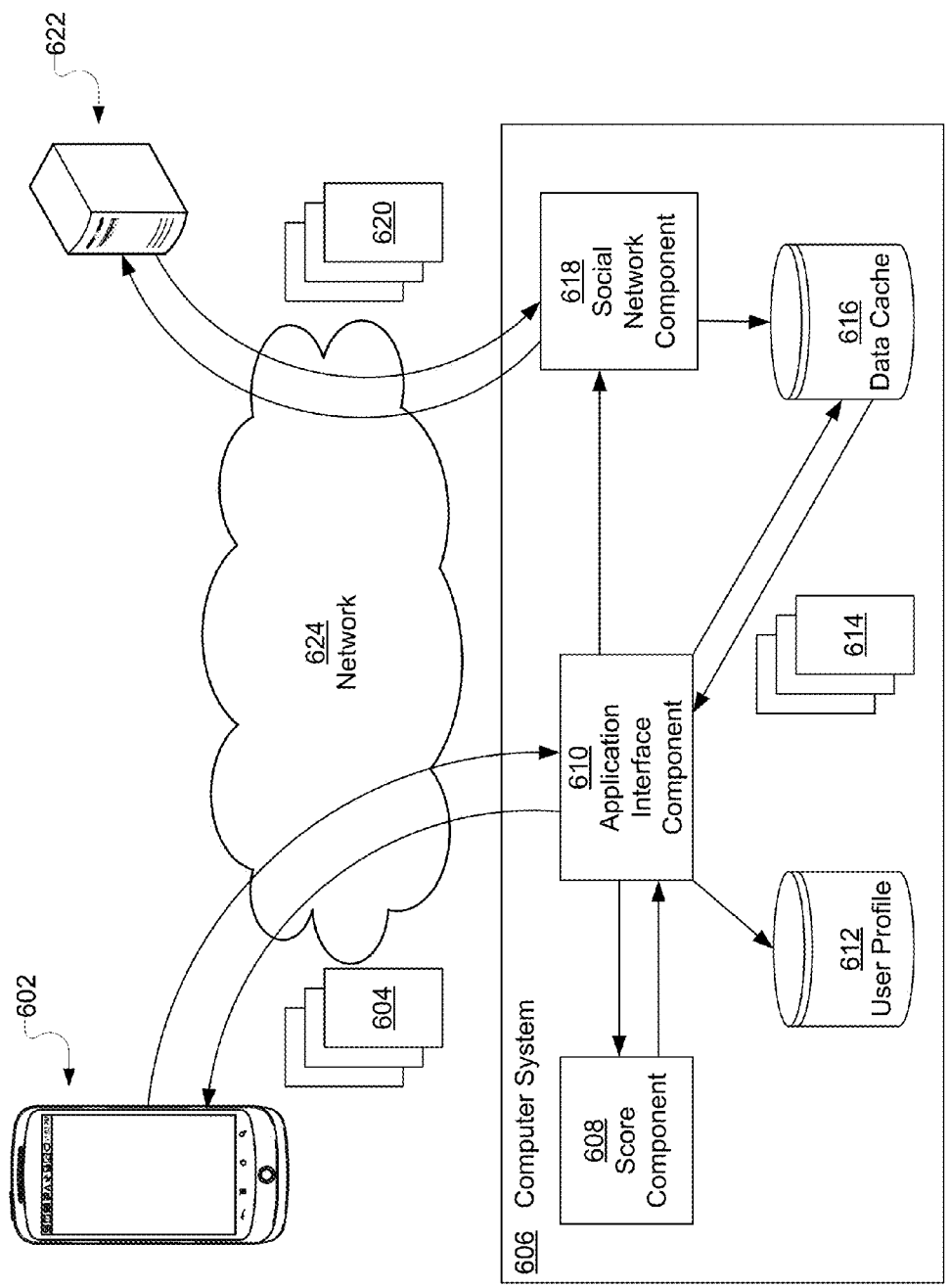
FIG. 6 illustrates a user device, a computer system, and an electronic social networking platform.

FIG. 6 illustrates example interactions between a user device 602, a computer system 606, and an electronic social networking platform 622.

The computer system 606 requests posts 620 from and events 620 sponsored by pages in the electronic social networking platform 622 from the electronic social networking platform 622. The computer system 606 may maintain a list or other data structure of all pages with which users of the computer system 606 have a relationship within the electronic social networking platform 622. The computer system 606 requests posts and events for pages included on the list from the electronic social networking platform 622.

New pages may be added to the list as a consequence of users forming new relationships with pages in the electronic social networking platform 622 that are not already included on the list. For example, when a user logs onto the computer system 606 and/or navigates to the user interface 200 of FIG. 2 that presents indications of the pages to which the user is connected within the electronic social networking platform 622, the computer system 606 may request a list of pages with which the user has a relationship from the electronic social networking platform 622. The pages provided by the electronic social networking platform 622 in response are compared to the list of pages maintained by the computer system 606. Any pages that were provided by the electronic social networking platform 622 but are not on the list are added to the list. When a new page is added to the list, a social networking component 618 extracts posts and events from the page from the electronic social networking platform 622 and stores the extracted posts and events in data cache 616.

After new pages have been added to the list and post and event information for the pages have been stored in data cache 616, the social networking component 618 occasionally may request updated post and event information from the pages from the electronic social networking platform 622 in an effort to keep the post and event information for the pages stored in data cache 616 more or less in sync with the post and event information for the pages in the electronic social networking platform 622. In some implementations, the social networking component 618 extracts events or posts from pages on the list in response to a request from a user device. For example, when a user device requests events or posts from a particular page (or a particular category of pages), for example, as a consequence of a user requesting to navigate to a user interface such as user interface 300 of FIG. 3A, user interface 301 of FIG. 3B, user interface 400 of FIG. 4A, and/or user interface 401 of FIG. 4B, the social networking component 618 may extract posts or events for that page (or for pages within that category) from the electronic social networking platform.

Mechanisms may be employed to regulate the load that is imposed on computer system 606 and/or social networking platform 622 by requesting the extraction of data from the social networking platform 622. For example, pages for which posts and events already are stored in the data cache 616, the data cache 616 can include a last event extraction time that reflects the last time that updated event information for the page was extracted from the social networking platform 622 and a last post extraction time that reflects the last time that updated post information was extracted from the social networking platform 622. Before initiating the process to extract updated event or post information for the page from the social networking platform 622, the application interface component 610 may compare the last event extraction time or the last post extraction time for the page to the current time. If the time between the last extraction time and the current time is less than a threshold amount of time (e.g., 10 minutes), the application interface component 610 may determine not to initiate the process to extract updated event or post information for the page from the social networking platform 622. Alternatively, if the time between the last extraction time and the current time exceeds the threshold amount of time (e.g., 10 minutes), then the application interface component 610 may determine to initiate the process to extract updated event or post information for the page from the electronic social networking platform 622.

As described in greater detail below, in some implementations, newly extracted event or post information for the page may not actually be provided to the user device that initiated the updating extraction for the page. Instead, the user device that triggered the updating extraction for the page may be provided with events or posts that already were stored in the data cache 616 at the time the user device requested events or posts from the page, while the newly extracted events or posts are added to the data cache 616 to be provided to the next user device that requests events or posts from the page. Consequently, events or posts from the page may be provided to the user device even if the social networking component 618 is unable to extract event or post information for the page from the electronic social networking platform 622 in substantially real time.

Furthermore, extracting updated event or post information for pages in this fashion may result in the event or post information for pages for which event or post information is requested relatively often being updated relatively frequently, while event or post information for pages for which event or post data is requested relatively infrequently is updated relatively infrequently. Moreover, extracting updated event or post information for pages in this fashion may serve as an appropriate mechanism for regulating the load that is imposed on computer system 606 and/or social networking platform 622 by requesting the extraction of data from the social networking platform 622.

It should be noted that, in some implementations, in order to keep the event or post information stored in data cache 616 relatively up to date even for pages for which event or post information is requested relatively infrequently, application interface component 610 may cause updated event or post information for a page to be extracted from the social networking platform 622 if application interface component 610 determines that the event or post information for the page has not been updated for some defined period of time. For example, if the application interface component 610 determines that the event or post information for a page stored in data cache 616 has not been updated within a 24 hour period, the application interface component 610 may cause updated event or post information for a page to be extracted from the social networking platform 622.

In response to a request by social networking component 618 to extract event or post information for a page from the electronic social networking platform 622, the electronic social networking platform 622 provides the current event or post information for the page 620 to the social network component 618. The social networking component 618 updates the data cache 616 by adding and updating the posts and events received from the electronic social networking platform 622.

A user device 602 requests posts and/or events for pages on the electronic social networking platform 622. The request can be generated in response to a user requesting to view a particular feed of events and/or posts (e.g., one of the feeds of events or posts presented in user interface 300 of FIG. 3A, user interface 301 of FIG. 3B, user interface 400 of FIG. 4A, or user interface 401 of FIG. 4B). The request can be provided to an application interface component 610 on a computer system 606. The computer system may be, for example, a computer device executing a program or set of programs which provide the functionality described herein.

The request can identify the user of the user device, for example, the request may include a user identifier associated with the user on the electronic social networking platform 622. The request may specify whether the user is requesting events or posts. The request may also include other information, for example, a particular page or categories of pages for which the user is requesting events, posts, or both.

Upon receiving the request, the application interface component 610 may identify the user making the request. Once the user is identified, the application interface component 610 may access a user profile associated with the user. The user profile can be stored in a user profile data store 612. The user profile can include information such as a user identifier that identifies the user to the electronic social network platform 622. The user profile can also include information such as a list of the pages to which the user is connected within the social networking platform (e.g., a list of pages that the user has endorsed in the electronic social networking platform) and categorization information describing how the user desires the pages to which the user is connected to be organized. The application interface component 610 may use the user profile to identify the pages for which the events or posts were requested. For example, if a request requests posts from pages in the restaurant category, then the application interface component 610 can use information stored in the user profile data store 612 to determine which pages are included in the restaurant category for that user.

In some implementations, the list of pages to which the user is connected within the social networking platform may be updated each time the user logs into the system and/or each time and the user accesses the user interface described above with respect to FIG. 2.

After identifying the pages for which posts or events were requested, the application interface component 610 obtains posts or events 614 associated with the requested pages from a data cache 616. As described above, events and posts associated with the requested pages previously may have been extracted from the electronic social networking platform and stored in the data cache 616. In some implementations, the efficiency of the system can be improved by storing the events and posts for the requested pages locally in a data cache 616 as opposed to extracting events and/or posts from the electronic social networking platform 622 when user requests for events and/or posts are received. For example, accessing the cached posts and events may avoid latency associated with obtaining posts and events from the electronic social networking platform 622.

In some implementations, the data cache 616 may be subdivided into different caches, each with different performance characteristics. For instance, posts or events for recently accessed pages may be stored in an in-memory cache, for example, a data store that is maintained in the volatile memory of the computer system 606. To obtain posts or events for a particular page for which posts or events were requested, the application interface component 610 can first check the memory cache. If posts or events for the page are not present in the in-memory cache, the application interface component 610 can check a persistent cache, for example, a data store that is maintained in the non-volatile memory of the computer system 606. Finally, if posts or events for the page are not present in the persistent cache, the application interface component can extract the posts or events for the particular page from the electronic social networking platform 622, as described above.

Before returning obtained posts to the user device 602, the application interface component can identify one or more trending posts within the collection of obtained posts. A score component 608 determines (e.g., calculates) a score for each post in the collection. As discussed above, the score for an individual post can be a function of a measure of the popularity of the post. The measure of popularity can be a function of one or more of the number of comments the post has received, the number of individuals who have expressed interest in the post, for example, by endorsing the post, and the age of the post.

In some implementations, the score for an individual post is calculated each time the post is requested by a user device. For example, when the application interface component 610 obtains a post from the data cache 616, the application interface component 610 provides the post to the score component 608 to calculate the score.

In some implementations, the score can be pre-calculated for posts stored in the data cache. For example, the score for an individual post can be calculated whenever the post is added to or updated in the data cache and stored in association with the post.

In other implementations, a portion of the measure of the popularity of an individual post can be pre-calculated. For example, for an individual post, the portion of the measure of popularity corresponding to the number of comments and the number of individuals who have expressed interest in the post can be pre-calculated. Then, at the time the application interface component 610 obtains the post for the user device 602, the pre-calculated component of the measure of the popularity of the individual post can be divided by the age of the post to determine a final score. The age of the post can be determined as the time lapse between the current time and a timestamp of the post identifying when the post was created.

After obtaining the posts or events for the pages from which posts or events were requested, the application interface component provides the events or posts 604 to the user device 602. The user device can display the events or posts to the user in the manner described above.

As described above, in some implementations, receipt of a request from a user device 602 for events or posts from a page triggers the application interface component 610 to obtain events or posts from the page from data cache 616 and then return these events or posts to the requesting user device 602. However, in some such implementations, receipt of a request from a user device for events or posts from a page also may trigger the application interface component 610 to initiate the process for extracting updated event or post data for the page from the social networking platform 622 (e.g., by sending a message to the social network component 618 requesting that the event or post data for the page by updated). Thereafter, any new events or posts from the page extracted from the social networking platform 622 as a result of requesting updated event or post data for the page from the social networking platform 622 may be stored in data cache 616 so that the new events or posts are available to serve to user devices in response to future requests from user devices for events or posts from the page. Notably, in such implementations, the new events or posts from the page extracted from the social networking platform 622 may not actually be served to the user device 602 from which the request was received that triggered their extraction. Instead, the new events or posts from the page may be available to serve in response to future requests for events or posts from the page.

Figure 7:
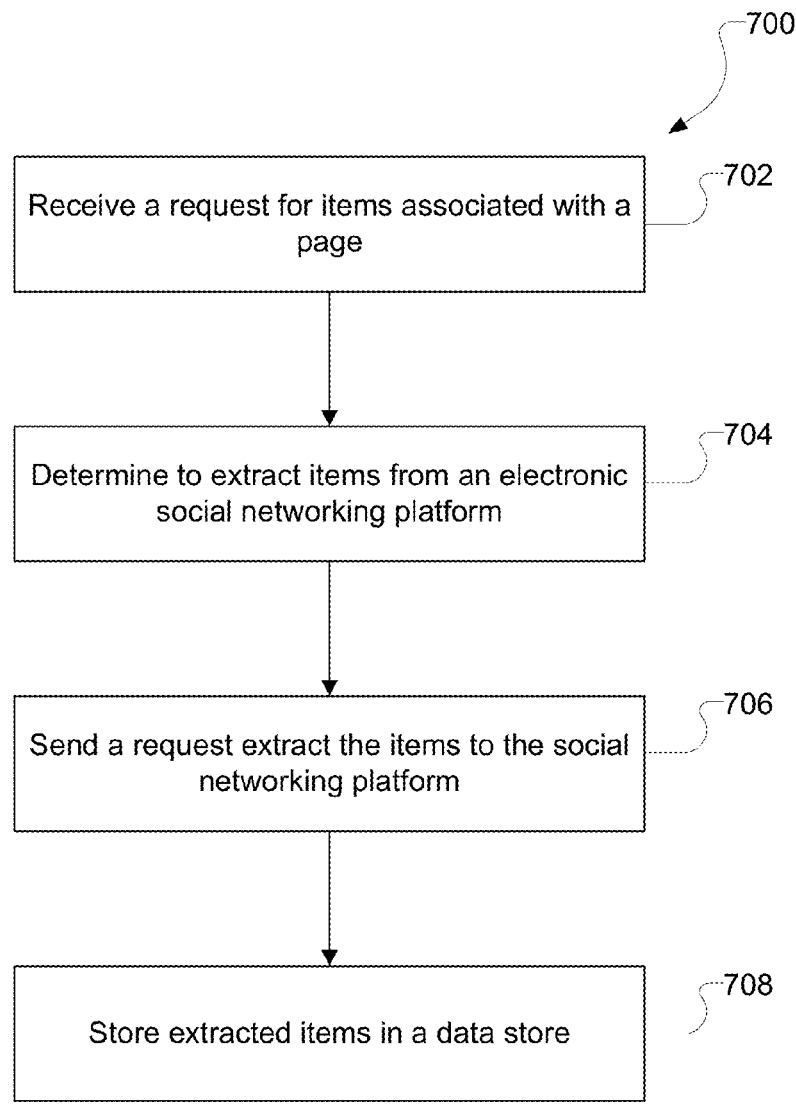
FIG. 7 is a flowchart of an example process for updating posts and events in a data cache.

FIG. 7 is a flowchart of an example process for updating post and/or event data for a page of a social networking platform that is stored in a data cache. The process may be performed by a computer system, for example, the computer system 606 of FIG. 6. For simplicity the process will be described in terms of a system performing the process.

A request for items associated with a page is received (702). The requested items may be posts and/or events. For example, the application interface component 610 receives a request from the user device 602. The request can be generated in response to a request to access a feed of posts or events using a user interface, for example, the user interfaces 300 and 301 described above with respect to FIGS. 3A and 3B and/or the user interfaces 400 described above with respect to FIGS. 4A and 4B.

It is determined to extract items from an electronic social networking platform (704). For example, the application interface component 610 may determine that sufficient time has passed between the last time items (e.g., posts and/or events) were extracted from the electronic social media platform for the requested page. The last time items were extracted from the electronic social media platform for the page may be stored as a time stamp in association with the page. The current time can be compared to the time stamp to determine the elapsed time. If the elapsed time is greater than a threshold (e.g., 10 minutes), the system determines to extract items from the electronic social networking platform. If the elapsed time is less than the threshold, the system determines not to extract items from the electronic social networking platform.

A request to extract the items is sent to the social networking platform (706). The request requests to extract posts and/or events from the social networking platform for a particular page or set of pages. For example, the social network component 618 can request items for a particular page or set of pages from the electronic social networking platform 622. In some implementations, the request requests to extract only items for the particular page or set of pages from the social networking platform that have been added or updated since the last time the items for the particular page or set of pages were extracted. In other implementations, the request requests to extract all items for the page. The number of items and/or the age of the items extracted may be limited by the electronic social networking platform 622 or the request.

In response to the request to extract the items, the social networking platform returns the requested items. The items returned by the social networking platform then are stored in a data store (708). The items extracted from the social networking platform can be stored in a persistent data store. For example, the social networking component 618 may add or update the items to the data cache 616. If the items extracted from the social networking platform are posts, any posts already present in the cache may be updated to reflect the current number of comments and endorsements associated with the post within the electronic social networking platform. The data store may be, for example, a relational database, a hierarchical database, or one or more files stored on a file system.

Figure 8:
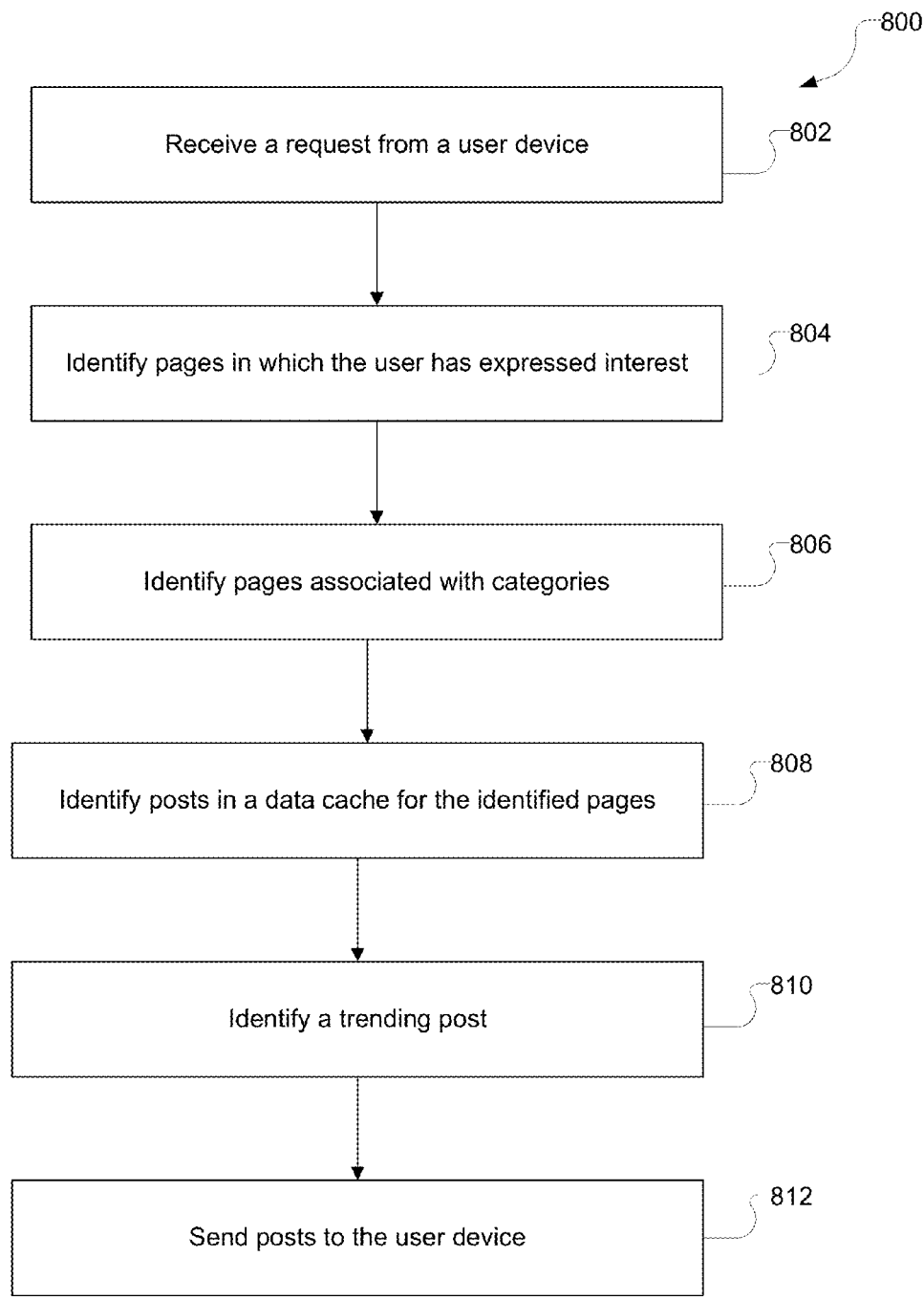
FIG. 8 is a flow chart of an example process for providing posts to a user device.

FIG. 8 is a flow chart of an example process for providing posts to a user device (e.g., to generate a user interface such as user interfaces 300 and 301 shown in FIGS. 3A and 3B). The process may be performed by a computer system, for example, the computer system 606 of FIG. 6. For simplicity the process will be described in terms of a system performing the process.

A request is received from a user device (802). The request may identify the user and may identify one or more categories for which the user desires to view posts. In some implementations, the request may identify a page, a category of pages, or an indication to view pages from all of the categories of pages. For example, a user interacting with the user interface 300 of FIG. 3A causes the user device to send the request to a computer system.

Pages in which the user has expressed interest are identified (804). A user may have expressed interest in a page by forming a relationship with the page on an electronic social networking platform, for example, by endorsing the page, linking to the page, or through some other mechanism. The pages can be limited to pages associated with organizations, for example, pages which are managed and maintained by an organizational entity. A collection of pages in which the user has expressed interest may be stored in a persistent data store. For example, in the example of FIG. 3A, the computer system would identify the Favorite Band, MicroStrategy, and the Fusion Fusion Restaurant, among others, as pages in which the user has expressed interest.

Pages associated with the category or categories specified in the request are identified (806). If the selected category is a category other than "all", then the process determines a subset of the pages that are associated with a category identified by the request. In some implementations, the pages in which the user has expressed interest and the pages associated with the identified categories can be determined concurrently, for example, through a single query to a database. Categories may be selected, for example, through the user interface 200 of FIG. 2.

Posts stored in a data cache are identified for the identified pages (808). Posts are identified for the pages in which the user has expressed interest and that are associated with a category identified in the request. Furthermore, in some examples, a time threshold is applied to the posts such that only posts that are less than a defined age (e.g., 1 week, 2 weeks, 1 month, etc.) may be identified.

A trending post, such as the post 108 shown in FIG. 3A, is identified from among the identified posts (810). Each identified post may be associated with a score. As described above, the score may be a measure of the popularity of the post. The post with the highest score may be determined to be the trending post. In some examples, several trending posts may be identified.

The posts are sent to the user device (812). The user device may display the posts in a number of different formats. In some implementations, the user device displays the trending post first and the remaining posts in chronological order based on when they were published. The selected posts may be presented to the user on a user device, for example, by the user interface 300 of FIG. 3A.

Figure 9:
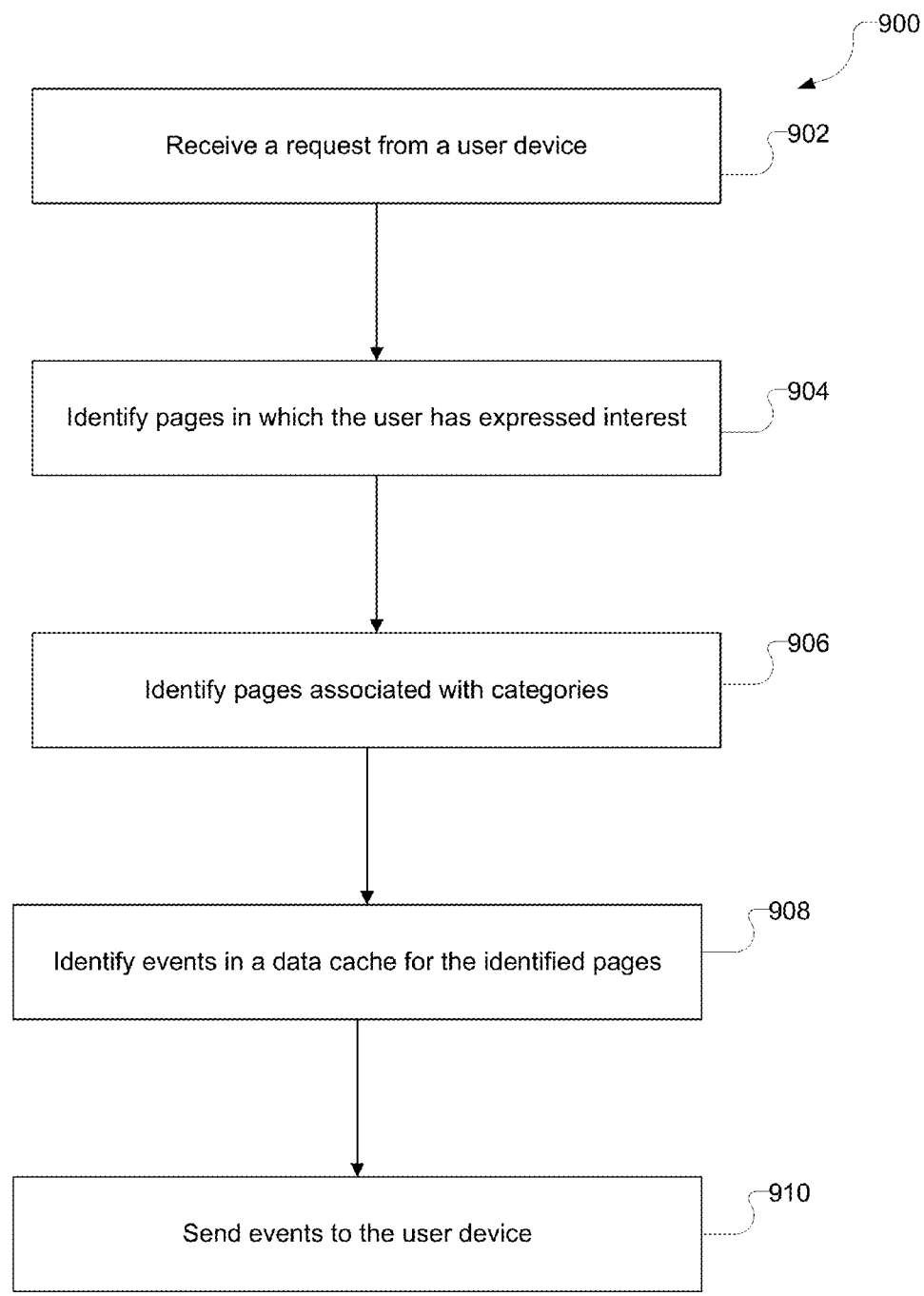
FIG. 9 is a flow chart of an example process for providing posts to a user device.

FIG. 9 is a flow chart of an example process for providing events to a user device. Such a process can be used to generate the user interface shown in FIG. 4A. The process may be performed by a computer system, for example, the computer system 606 of FIG. 6. For simplicity the process will be described in terms of a system performing the process.

A request is received from a user device (902). The request may identify the user and identify one or more categories of pages for which the user desires to view events. In some implementations, the request may identify a page, a category of pages, or an indication to view pages from all of the categories of pages. The request may be received from a user device presenting the user interface 400 of FIG. 4A.

Pages in which the user has expressed interest are identified (904). A user may have expressed interest in a page by forming a relationship with the page on an electronic social networking platform, for example, by endorsing the page, linking to the page, or through some other mechanism. The pages can be limited to pages associated with organizations, for example, pages which are managed and maintained by an organizational entity. A collection of pages in which the user has expressed interest may be stored in a persistent data store.

Pages associated with the category or categories specified in the request are identified (906). If the selected category is a category other than "all", then the process determines a subset of pages in which the user has expressed interest that are included in the selected category. The subset includes pages that are associated with the category or categories identified by the request. In some implementations, the pages in which the user has expressed interest and the pages associated with the identified categories can be determined concurrently, for example, through a single query to a database. Categories may be selected, for example, using a user interface, such as the user interface 200 of FIG. 2.

Events stored in a data cache are identified for the identified pages (908). Events are identified for the pages in which the user has expressed interest and that are associated with a category identified in the request. In some implementations, the events are associated with a date and a location. In other implementations, a location may be determined for any event that does not identify a location, for example, by sending a query to a conventional search engine.

The events are sent to the user device (910). The user device may display the events in a number of different formats. For example, the events may be displayed in chronological order as shown in FIGS. 4A and 4B or based on location, as shown in FIG. 5.

Implementations of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Implementations of the subject matter described in this specification can be implemented as one or more computer programs, i.e., one or more modules of computer program instructions encoded on a tangible program carrier for execution by, or to control the operation of, data processing apparatus. Alternatively or in addition, the program instructions can be encoded on a propagated signal that is an artificially generated signal, e.g., a machine-generated electrical, optical, or electromagnetic signal, that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The term "data processing apparatus" encompasses all kinds of apparatus, devices, and machines for processing data, including by way of example a programmable processor, a computer, or multiple processors or computers. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, or a combination of one or more of them.

A computer program (which may also be referred to as a program, software, a software application, a script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Computers suitable for the execution of a computer program include, by way of example, can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices.

Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or of what may be claimed, but rather as descriptions of features that may be specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Particular implementations of the subject matter have been described. Other implementations are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous. In certain implementations, criteria posts and/or events can be extracted from the electronic social networking platform and presented to a user based on information other than pages. For example, posts and/or events may be extracted based on identified interests, social relationships between different users, key word searching, etc.

What is claimed is:

1. A computer implemented method comprising:
    filtering a set of pages that are maintained in a social networking platform and in which a user has expressed interest based on one or more user-identified categories to identify a subset of the pages that are associated with the one or more identified categories;
    identifying posts in a data store associated with the pages in the subset;
    identifying a trending post from among the identified posts based on a measure of popularity of the identified posts;
    sending data to a user device to cause the user device to display at least the trending post and some additional other identified posts from among the identified posts with the trending posts and the additional other identified posts ordered in the display with the trending post presented first and the additional other posts ordered chronologically;
    determining to extract, from the electronic social networking platform, new posts for a page in the subset of pages based on a time of filtering the set of pages and a time of previous extraction of posts from the page; and
    storing the extracted new posts for the page in the data store;
    wherein determining to extract new posts for the page includes determining that a time lapse between the time of filtering to a time of a previous extraction of posts for the page is greater than a threshold.

2. The method of claim 1, wherein identifying posts in the data store associated with the pages in the subset includes identifying posts in the data store associated with the pages in the subset before storing the extracted new posts in the data store.

3. The method of claim 1, wherein identifying the trending post comprises:

calculating a score for each of multiple posts among the identified posts based on a count of users who have expressed interest in the post, a count of comments the post has received, and an age of the post.

4. The method of claim 3, wherein calculating the score includes calculating a sum of twice the count of comments the post has received and the count of users who have expressed interest in the post, and dividing that sum by the age of the post.

5. The method of claim 3, wherein the age of the post is determined in hours.

6. The method of claim 1, wherein filtering the set of pages to identify the subset of pages includes:
   identifying at least one page in which the user has expressed interest but that the user had previously indicated to exclude; and
   excluding the at least one page from the subset.

7. The method of claim 1, further comprising identifying a time period;
   wherein identifying posts in the data store comprises identifying posts that occurred within the time period.

8. The method of claim 1, further comprising:
   receiving a request to display posts associated with a second category different from the one or more categories;
   filtering the set of pages to identify a second subset of the pages that are associated with the second category;
   identifying second posts in the data store associated with the pages in the second subset;
   identifying a second trending post from among the identified second posts based on a measure of popularity of the identified second posts; and
   sending second data to the user device to cause the user device to display at least the second trending post and some additional other second posts from among the identified second posts with the trending post and the additional other second posts ordered in the display with the second trending post presented first and the additional other second posts ordered chronologically.

9. The method of claim 1, wherein the data store is a cached data store.

10. A non-transitory computer storage device encoded with computer program instructions that when executed by one or more computers cause the one or more computers to perform operations comprising:
    filtering a set of pages that are maintained in a social networking platform and in which a user has expressed interest based on one or more user-identified categories to identify a subset of the pages that are associated with the one or more identified categories;
    identifying posts in a data store associated with the pages in the subset;
    identifying a trending post from among the identified posts based on a measure of popularity of the identified posts;
    sending data to a user device to cause the user device to display at least the trending post and some additional other identified posts from among the identified posts with the trending post and the additional other identified posts ordered in the display with the trending post presented first and the additional other posts ordered chronologically;
    determining to extract, from the electronic social networking platform, new posts for a page in the subset of pages based on a time of filtering the set of pages and a time of previous extraction of posts from the page; and
    storing the extracted new posts for the page in the data store;
    wherein determining to extract new posts for the page includes determining that a time lapse between the time of filtering to a time of a previous extraction of posts for the page is greater than a threshold.

11. The non-transitory storage device of claim 10, wherein identifying the trending post comprises:
    calculating a score for each of multiple posts among the identified posts based on a count of users who have expressed interest in the post, a count of comments the post has received, and an age of the post, including calculating a sum of twice the count of comments the post has received and the count of users who have expressed interest in the post, and dividing that sum by the age of the post.

12. The non-transitory storage device of claim 10, wherein the instructions that when executed by one or more computers further cause the one or more computers to perform operations comprising:
    receiving a request to display posts associated with a second category different from the one or more categories;
    filtering the set of pages to identify a second subset of the pages that are associated with the second category;
    identifying second posts in the data store associated with the pages in the second subset;
    identifying a second trending post from among the identified second posts based on a measure of popularity of the identified second posts; and
    sending second data to the user device to cause the user device to display at least the second trending post and some additional other second posts from among the identified second posts with the trending post and the additional other second posts ordered in the display with the second trending post presented first and the additional other second posts ordered chronologically.

13. A system comprising:
    one or more computers and one or more storage devices storing instructions that are operable, when executed by the one or more computers, to cause the one or more computers to perform operations comprising:
    filtering a set of pages that are maintained in a social networking platform and in which a user has expressed interest based on one or more user-identified categories to identify a subset of the pages that are associated with the one or more identified categories;
    identifying posts in a data store associated with the pages in the subset;
    identifying a trending post from among the identified posts based on a measure of popularity of the identified posts;
    sending data to a user device to cause the user device to display at least the trending post and some additional other identified posts from among the identified posts with the trending post and the additional other identified posts ordered in the display with the trending post presented first and the additional other posts ordered chronologically;
    determining to extract, from the electronic social networking platform, new posts for a page in the subset of pages based on a time of filtering the set of pages and a time of previous extraction of posts from the page; and
    storing the extracted new posts for the page in the data store;
    wherein determining to extract new posts for the page includes determining that a time lapse between the time of filtering to a time of a previous extraction of posts for the page is greater than a threshold.

14. The system of claim 13, wherein identifying the trending post comprises:

calculating a score for each of multiple posts among the identified posts based on a count of users who have expressed interest in the post, a count of comments the post has received, and an age of the post.

15. The system of claim 14, wherein calculating the score includes calculating a sum of twice the count of comments the post has received and the count of users who have expressed interest in the post, and dividing that sum by the age of the post.

16. The system of claim 13, wherein the instructions that when executed by one or more computers further cause the one or more computers to perform operations comprising:
   receiving a request to display posts associated with a second category different from the one or more categories;
   filtering the set of pages to identify a second subset of the pages that are associated with the second category;
   identifying second posts in the data store associated with the pages in the second subset;
   identifying a second trending post from among the identified second posts based on a measure of popularity of the identified second posts; and
   sending second data to the user device to cause the user device to display at least the second trending post and some additional other second posts from among the identified second posts with the trending post and the additional other second posts ordered in the display with the second trending post presented first and the additional other second posts ordered chronologically.

\* \* \* \* \*

UNITED STATES PATENT AND TRADEMARK OFFICE
CERTIFICATE OF CORRECTION

| | | |
|---|---|---|
| PATENT NO. | : 9,037,577 B1 | Page 1 of 1 |
| APPLICATION NO. | : 13/723427 | |
| DATED | : May 19, 2015 | |
| INVENTOR(S) | : Michael J. Saylor et al. | |

It is certified that error appears in the above-identified patent and that said Letters Patent is hereby corrected as shown below:

IN THE CLAIMS

Column 20, Line 5, Claim 11, delete "non-transitory storage device", and insert --non-transitory computer storage device--.

Column 20, Line 15, Claim 12, delete "non-transitory storage device", and insert --non-transitory computer storage device--.

Signed and Sealed this
Third Day of November, 2015

Michelle K. Lee
*Director of the United States Patent and Trademark Office*